US006848271B2

(12) United States Patent
Auras et al.

(10) Patent No.: US 6,848,271 B2
(45) Date of Patent: Feb. 1, 2005

(54) AUTOMATED METHOD AND DEVICE FOR MANUFACTURING A GLASS BLOWN OBJECT

(75) Inventors: Stefan Auras, Mittweida (DE); Katrin Scholz, Bobritzsch (DE); Wolfgang Babel, Weil der Stadt (DE)

(73) Assignee: Endress + Hauser Conducta Gesellschaft fur Mess- und Regeltechnik mbH + Co., Gerlingen (DE)

( * ) Notice: Subject to any disclaimer, the term of this patent is extended or adjusted under 35 U.S.C. 154(b) by 294 days.

(21) Appl. No.: 10/106,439

(22) Filed: Mar. 27, 2002

(65) Prior Publication Data

US 2003/0056539 A1 Mar. 27, 2003

(30) Foreign Application Priority Data

Mar. 30, 2001 (DE) ......................................... 101 16 075

(51) Int. Cl.$^7$ ................................................ C03B 9/40
(52) U.S. Cl. ..................... 65/29.11; 65/29.14; 65/29.15; 65/29.18; 65/158; 65/161; 65/164; 65/301; 382/141; 382/142
(58) Field of Search ........................... 65/29.11, 29.14, 65/29.15, 29.17, 29.18, 158, 160, 161, 164, 300, 301; 382/141, 142; 700/157

(56) References Cited

U.S. PATENT DOCUMENTS

| | | | | |
|---|---|---|---|---|
| 900,914 A | * | 10/1908 | Clarke | 65/301 |
| 3,407,055 A | * | 10/1968 | Argyle et al. | 65/161 |
| 3,429,683 A | * | 2/1969 | Jehn | 65/301 |
| 3,438,396 A | * | 4/1969 | Jehn | 137/596.18 |
| 3,472,638 A | * | 10/1969 | Rosen | 65/29.18 |
| 3,486,875 A | * | 12/1969 | Pymm | 65/158 |
| 3,573,891 A | * | 4/1971 | Ayres | 65/110 |
| 3,729,301 A | * | 4/1973 | Heaton et al. | 65/81 |
| 3,977,856 A | * | 8/1976 | Rosen | 65/29.18 |

(List continued on next page.)

FOREIGN PATENT DOCUMENTS

| | | | | |
|---|---|---|---|---|
| DE | 4027679 | | * | 4/1991 |
| DE | 10116099 | A1 | * | 10/2002 |
| EP | 470269 | | * | 2/1992 |
| JP | 55-32705 | | * | 3/1980 |
| JP | 55-87918 | | * | 7/1980 |
| JP | 56-100316 | | * | 8/1981 |
| JP | 7-330342 | | * | 12/1995 |
| JP | 10-281851 | | * | 10/1998 |
| WO | 99/01741 | | * | 1/1999 |

*Primary Examiner*—Sean Vincent
(74) *Attorney, Agent, or Firm*—Paul Vincent

(57) ABSTRACT

The invention concerns an automated method for producing a blown glass body, in particular a glass wall of an electrochemical sensor, wherein an immersion tube (10), through which air or gas can flow, is immersed into molten glass an amount of molten glass from the molten glass mass, and wherein the (8) and subsequently withdrawn to remove removed glass is blown into the form of the glass body to be produced by means of the air or gas flowing through the immersion tube (10), comprising the following features:— the position of the surface (42) of the molten glass (8) in the adjustment direction of the immersion tube (10) is determined; an adjustment means (18) for the immersion tube (10) is controlled in correspondence with the determined position of the surface (42) such that the free end of the immersion tube is first immersed into the molten glass mass (8) up to a certain predetermined immersion depth (h) of molten glass; and then removed thereby retaining a predetermined amount—following removal from the molten glass, the immersion tube (10) is loaded with a blow pressure along a blow pressure curve p(t) stored in a computer thereby blowing the glass body into the desired shape. This provides reproducible and automated production of the glass body.

12 Claims, 2 Drawing Sheets

U.S. PATENT DOCUMENTS

| | | | |
|---|---|---|---|
| 4,135,204 A | * | 1/1979 | Davis et al. .................. 348/86 |
| 4,205,973 A | * | 6/1980 | Ryan .......................... 65/29.1 |
| 5,369,713 A | * | 11/1994 | Schwartz et al. ........... 382/142 |
| 5,611,834 A | * | 3/1997 | Walter et al. .............. 65/29.12 |
| 5,779,749 A | * | 7/1998 | Nafziger .................... 65/29.11 |
| 6,557,379 B1 | * | 5/2003 | Nagasawa et al. ......... 65/29.12 |
| 2003/0101752 A1 | * | 6/2003 | Anheyer et al. .............. 65/161 |

* cited by examiner

AUTOMATED METHOD AND DEVICE FOR MANUFACTURING A GLASS BLOWN OBJECT

BACKGROUND OF THE INVENTION

The invention concerns a method for producing a blown glass body, in particular a glass wall or structural component of an electrochemical sensor, e.g. a pH sensor or other ion-sensitive sensor, wherein an immersion tube, through which air or gas can flow, is immersed into a glass melt and subsequently withdrawn to remove an amount of molten glass from the glass melt, wherein the removed glass is blown, by means of air or gas flowing through the immersion tube, into the desired shape of the glass body (referred to as "blowing in" a glass body). The invention also concerns a device for carrying out such a method.

Glass bodies, in particular in the shape of a sphere, a spherical cap or a cylinder have been produced manually by mechanical techniques in glass-blowers' workshops through immersion of a tubular, mostly but not necessarily cylindrical body which forms the above-mentioned immersion tube, into a molten glass mass to absorb an approximately defined amount of liquid glass during subsequent removal of the immersion tube. Via his/her mouth, the glass blower blows air through the immersion tube thereby blowing the glass body to be produced from the retained amount of viscous molten glass. This process requires the skills and experience of a glass blower. Other similar manual methods are also known.

It is the object of the present invention to automate this method.

SUMMARY OF THE INVENTION

This object is achieved by an automated method comprising the features of the independent method claim:

the position of the surface of the molten glass in the adjustment direction of the immersion tube is determined;

an adjustment means for the immersion tube is controlled in correspondence with the determined position of the surface such that the free end of the immersion tube is immersed to a certain predetermined immersion depth into the molten glass mass and removed, thereby absorbing a predetermined amount of molten glass;

outside of the molten glass, the immersion tube is loaded with a blow pressure following a blow pressure curve p(t) stored in a computer, thereby blowing the desired shape of the glass body.

Repeated immersion and withdrawal of the immersion tube reduces the amount of the available molten glass in the melting pot and the liquid level, i.e. the position of the surface of the molten glass in the pot is lowered. For this reason, it is difficult to remove a predetermined amount of molten glass using an automated method. The invention therefore proposes determining the position of the surface of the molten glass in the adjustment direction of the immersion pipe using techniques known per se. In dependence on the determined position of the surface of the molten mass, the movement of the immersion pipe is controlled such that the free end of the immersion pipe is immersed to a certain predetermined immersion depth into the molten glass mass for removing a predetermined amount of molten glass via the immersion tube, preferably after a certain dwell time, and by removing the immersion tube with a preferably predetermined speed at a constant molten glass temperature.

The position or the level of the surface of the molten glass in the adjustment direction of the immersion tube can—as mentioned above—be determined by techniques known per se. JP 7330342 e.g. discloses determination of the level of molten glass through a contact electrode immersed into the molten glass and a further contact electrode which approaches the surface. According to JP 10281851, a thermal element which is provided in a jacket through which cooling agent flows approaches the surface of the molten mass from the outside. Upon contact, the temperature rises to indicate the position of the surface of the molten glass.

JP 56100316 uses the reflection of a light beam on the surface of the molten glass. JP 55087918 A2 effects level determination via the principle of communicating tubes. JP 55032705 apparently applies the principle of light refraction on a surface of molten glass to determine the level.

DE 40 27 679 A1 keeps the surface level constant through weight measurement of the melting pot. According to WO 99/01741, the viscosity and the level of the liquid surface is determined by torsional fluctuations caused by immersing rods. EP 0 470 269 A applies the Archimedean principle of level determination.

When the molten drop which adheres to the free end of the immersion tube is loaded following an optimized blow pressure curve p(t), optimum blowing of the glass body to be produced is possible. The pressure dependence can be controlled or preferably regulated using a pump device to effect an optimum blow pressure curve p(t) within the immersion tube.

Exact determination of the position of the surface of the molten mass can ensure an automatic, defined predetermined immersion depth and hence a defined amount of molten mass removal at a constant molten glass temperature. The further measure of defined, optimum pressure load permits optimum automatic blowing of the desired glass body.

Advantageously, the immersion depth, the dwell time, and preferably also the speed of removal of the immersion pipe, which are all temperature dependent since they depend on the viscosity of the molten glass, are stored as parameters in a predetermined fashion in a computer controlling the process, wherein the adjusting means for the immersion pipe is controlled accordingly. Setting of the viscosity of the molten glass is achieved through controlling, setting, and maintaining the temperature of the molten mass.

In a further development of the inventive method, the body geometry to be produced (desired state) of the glass body is stored via predetermined reference points in the computer and the actual body geometry (actual state) is recorded via a camera and compared to the stored, desired data using an image processing means and a calculating program.

Application of this further inventive idea permits detection of the blown-in body after passage through the blow pressure curve (actual state) and comparison thereof to the stored data. A classification process can be carried out according to which the glass body is either rejected or can be classified into different quality classes depending on their proximity to the actual state.

The actual body geometry (actual state) can also be detected during blowing of the glass body in an intermittent or continuous fashion. In this manner, the blowing process can be stopped when a predetermined state has been reached, the pressure p(t) is thereby lowered in a predetermined fashion and the glass body solidifies. Control processes can also be performed by comparing the desired and actual states to e.g. increase the blow pressure when the diameter of the glass body is less than the desired values for a given p(t).

For the production of glass bodies which are to be used as structural components, such as a wall or component forming a casing or a receiving shaft of an electrochemical sensor, it is advantageous if a glass tube forming a channel, i.e. which is tubular in the broadest sense, is used as an immersion tube. It does not have to have a cylindrical shape. The immersion tube can be directly used, together with the blown-in glass body as a structural component of an electrochemical sensor.

The invention also concerns an automated device for carrying out the above method with the following features of the independent device claim:

- a glass melting means, in particular a pot which can be e.g. heated via induction and which has an inlet opening;
- an immersion tube through which air or gas can flow;
- a means for determining the position of the surface of the molten glass;
- an adjusting means for lowering, immersing and withdrawing the immersion tube into or out of the molten glass;
- a pump means for blowing-in the glass body;
- a computer-aided control means for controlling the adjusting means for the immersion tube in dependence on output values of the means for determining the position of the surface of the molten glass and for controlling the pump means corresponding to the stored blow pressure curve.

It is moreover advantageous when the automated device is an image recording device, e.g. in the form of a digital camera, for receiving the actual body geometry of the glass body, i.e. at the end or during the blow process, and an image processing device which can be formed in particular of a calculation program to process the image data into data which can be used for a comparison between the desired and actual states or which actually makes this comparison. It is also advantageous when the image processing device displays the image data of the actual body geometry on a display device, in particular a monitor, preferably underlayed with the desired data to be produced.

Further features, details and advantages of the invention for which protection is also individually sought can be extracted from the enclosed claims and the drawing and from the following description of the inventive method or of the inventive device.

BRIEF DESCRIPTION OF THE DRAWING

FIG. 2 shows the lower end of the immersion tube, just after the glass body is blown-in.

DESCRIPTION OF THE PREFERRED EMBODIMENT

Figure 1:
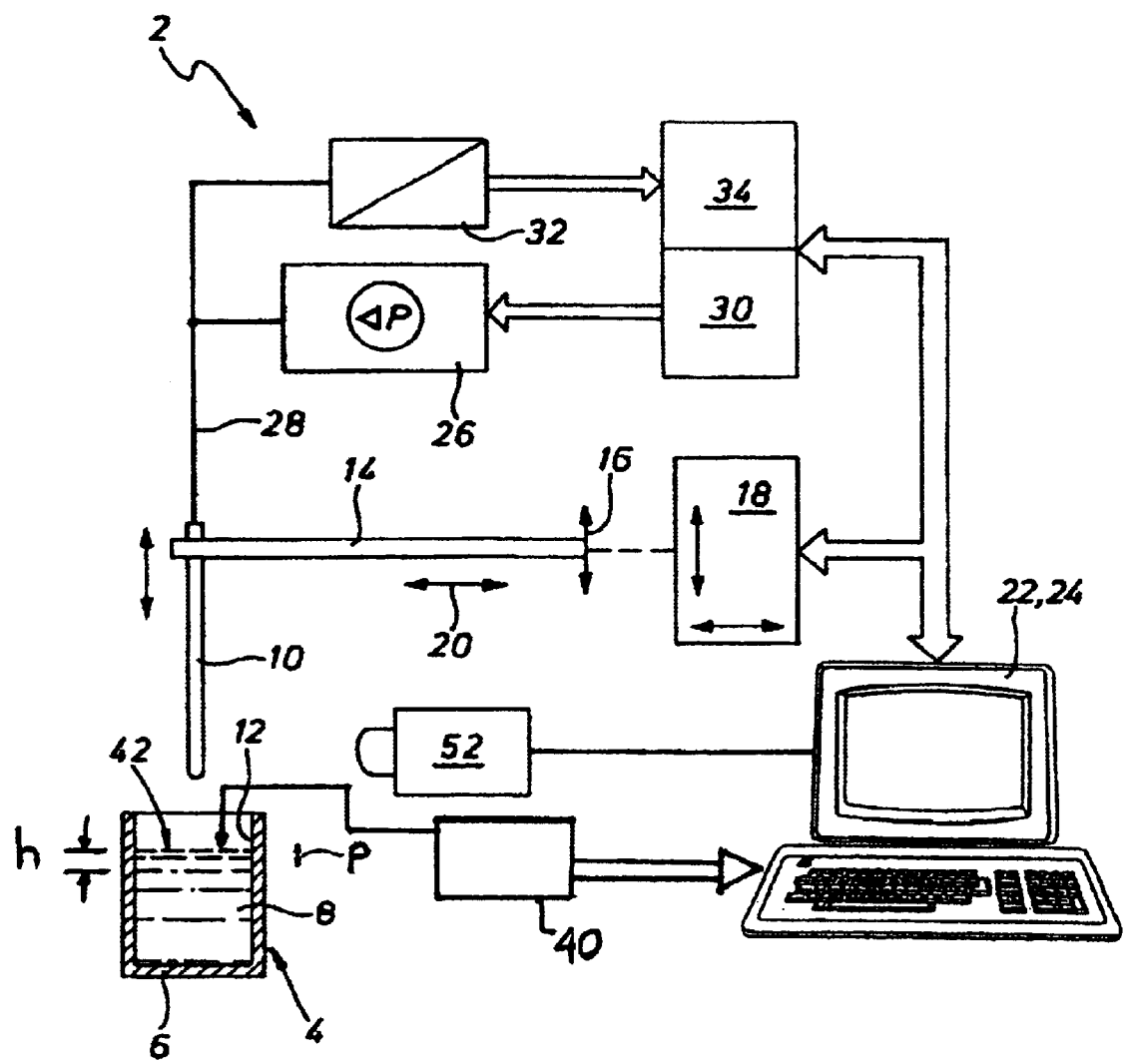
FIG. 1 shows a schematic representation of the inventive device for producing a blown glass body, wherein the method steps are indicated.

FIG. 1 shows a device, referred to in its entirety with reference numeral 2, for producing a blown glass body with the device components described below. A glass melting means 4 (in the simplest case a pot 6) can be preferably heated by an induction coil (not shown). The device also comprises an immersion tube 10 which can be any arbitrary glass tube. The immersion tube can be inserted through an opening 12 into the melting pot 6 and can be immersed into the molten glass 8. The immersion tube 10 is immersed into the molten glass 8 by lowering a holding device 14 for the immersion tube 10 in accordance with the double arrow 16. Towards this end, an adjusting means 18 is provided which can optionally carry out an additional motion in the direction of the double arrow 20.

The adjusting means 18 is computer-controlled and connected to a computer-aided control means 22 of a computer 24.

Reference numeral 26 designates a pump means for applying a blow pressure to the inside of the immersion tube 10. The connection between the pump device 26 and the one end of the immersion tube 10 is provided via a flexible tube 28. The pump means 26 is controlled via a data transmission means 30 by the computer-aided control means 22. Moreover, a pressure measuring means 32 in the form of a pressure sensor is provided which detects the blow pressure applied inside the immersion tube 10 and passes this information, via a transmission means 34, to the control means 22. In this fashion, a control circuit is formed and a blow pressure curve p(t) stored in a memory means of the computer 24 can be tracked with high precision.

Finally, a schematically indicated means 40 for determining the position P or the level of the surface 42 of the molten glass 8 is provided which is lowered with increasing removal of glass. The means 40 can have any design and passes data which can be processed, concerning the position or the level of the surface of the molten glass, to the control means 22.

Since the amount of molten glass 8 which is removed from the molten pot 6 during immersion and withdrawal of the immersion tube 10 depends on the immersion depth of the immersion tube 10 in the molten mass 8, the reproducible removal of a defined molten glass mass requires a constant, preferably predetermined, immersion depth. The position or the level of the surface 42 of the molten glass is lowered with successive samplings. For this reason it is essential that the means 40 precisely determine the position of the liquid surface 42 relative to a coordinate system of the holding device 14 or of the adjusting means 18 and pass this information on to the control means 22 of the computer 24 such that the immersion tube 10 can be lowered in dependence on this position to always maintain a reproducible, defined predetermined immersion depth.

The automated production of a blown glass body in accordance with the invention proceeds as follows:

At first, the level of the liquid surface 42 of the molten glass 8 is determined through the schematically shown means 40 and passed on to the control means 22. A comparison with the coordinate system of the adjusting means 18 can be easily effected via zero markings which can be coupled to each other or using contact sensors. After the means 40 detect the position or level of the liquid surface 42 in the adjustment direction of the immersion tube 10 and pass this information on to the control means 22, the adjustment means 18 is controlled such that the immersion tube 10 is initially lowered by such a distance that its free end is positioned at the level of the liquid surface 42 and is immersed to a predetermined immersion depth h (measured at the summit of the meniscus) into the molten glass 8. After a dwell time stored in the memory of the computer, the immersion tube is removed from the molten glass 8 by the adjustment means 18 with a predetermined motion or speed profile. A defined amount of viscous molten glass adheres to the free end of the immersion tube 10. The blow pressure curve p(t) stored in the computer 24 is now applied inside the immersion tube 10 by the pump means 26 in a computer-controlled and regulated fashion after removal from the molten mass, thereby blowing the glass body from the drop of molten glass adhering to the free end of the immersion tube 10. In this fashion, a spherical glass body with e.g. diameters of between 5 and 15 mm can be blown.

Figure 2:
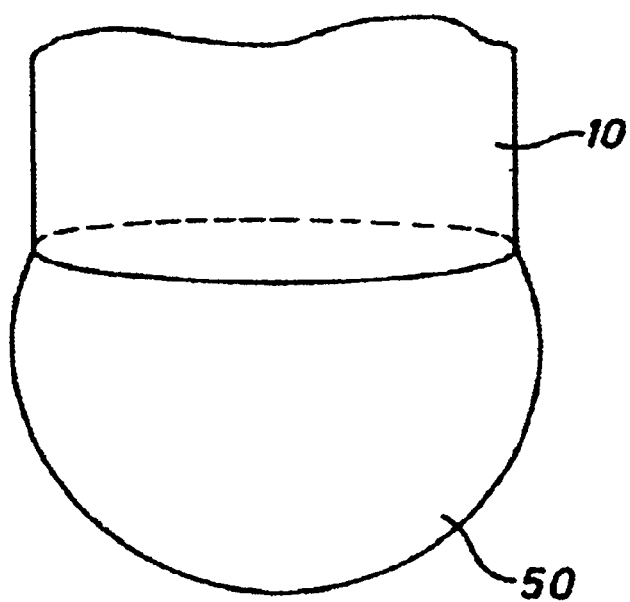

During this process, the actual geometry of the glass body 50 indicated at the free end of the immersion tube 10 in FIG. 2 can be recorded via an image recording device 52, e.g. a digital camera. During blowing, the configuration of the glass body 50 can be displayed on a display device, e.g. the display of the computer 24, via an image processing means in the form of an image processing program which preferably runs in the computer 24. The actual body geometry of the glass body 50 can be calculated and detected via the image processing means to permit a comparison to the desired data stored in the computer 24. In this fashion, one can determine whether or not a required size of the glass body 50 has been attained to terminate the blowing process for solidifying the glass body or whether the blowing process should be continued. Depending on the embodiment of the blowing process it is also possible to detect the actual body geometry, in particular, after solidification and to use this quantity for classification (rejections or subdivisions into different quality levels).

FIG. 2 shows the lower end of the immersion tube 10 immediately following the blowing of the glass body 50.

Figure 3:
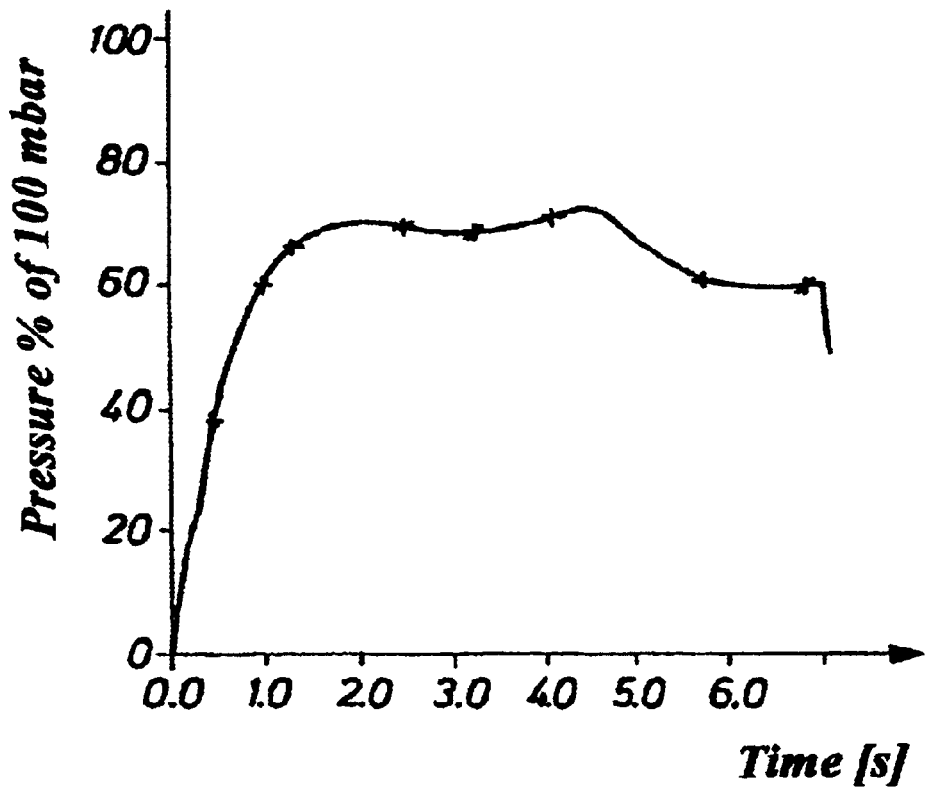
FIG. 3 shows a representation of a blow pressure curve p(t).

FIG. 3 shows an exemplary dependence of a blow pressure curve p(t).

What is claimed is:

1. An automated method for producing a blown glass body with which an immersion tube, through which air or gas can flow, is immersed into a molten glass mass and subsequently withdrawn to remove an amount of molten glass from the molten glass mass and the removed glass is blown, by means of the air or gas flowing through the immersion tube, into a shape of a glass body to be produced, the method comprising the steps of:

a) determining a position of a surface of the molten glass in an adjustment direction of the immersion tube;

b) controlling an adjustment means in accordance with said determined position of the surface to immerse a free end of the immersion tube into the molten glass up to a defined predetermined immersion depth;

c) removing said free end of the immersion tube from the molten glass thereby retaining a predetermined amount of molten glass; and d) loading the immersion tube with a blow pressure following a blow pressure curve stored in a computer, thereby blowing the glass body into a desired shape.

2. The method of claim 1, wherein the blown glass body is a glass wall or structural component of an electrochemical sensor.

3. The method of claim 1, wherein at least one of said immersion depth, a dwell time and a speed with which the immersion tube is removed from the molten glass are predetermined and stored in said computer to control said adjustment means.

4. The method of claim 1, further comprising storing a desired state body geometry of the glass body to be produced in said computer via predetermined reference points, wherein an actual state body geometry is recorded via a camera and compared to said stored, desired state using an image processing means and a computer program.

5. The method of claim 1, wherein step d) comprises the step of recording a development of an actual body geometry using a camera and comparing said actual body geometry to a stored, desired geometry using an image processing means and a computer program.

6. The method of claim 5, further comprising controlling or classifying said actual body geometry in dependence on a comparison between said desired and said actual geometries.

7. The method of claim 1, wherein a glass pipe is used as an immersion tube.

8. The method of claim 1, wherein the immersion tube, combined with the blown glass body, constitute one of a wall, a housing component, and a structural component of an electrochemical sensor.

9. An automated device for producing a blown glass body with which an immersion tube, through which air or gas can flow, is immersed into a molten glass mass and subsequently withdrawn to remove an amount of molten glass from the molten glass mass and the removed glass is blown, by means of the air or gas flowing through the immersion tube, into a shape of a glass body to be produced, the device comprising:

means for determining a position of a surface of the molten glass in an adjustment direction of the immersion tube;

means for controlling an adjustment means for the immersion tube in accordance with said determined position of the surface to immerse a free end of the immersion tube into the molten glass up to a defined predetermined immersion depth;

means for removing said free end of the immersion tube from the molten glass thereby retaining a predetermined amount of molten glass; and means for loading the immersion tube with a blow pressure following a blow pressure curve stored in a computer, thereby blowing the glass body into desired shape.

10. The device of claim 9, wherein said molten glass is contained in a vessel having an access opening and said loading means comprise pumping means controlled in correspondence with a stored blow pressure curve.

11. The device of claim 10, wherein said controlling means uses predetermined control parameters concerning immersion depth, immersion period and adjustment speed to correspondingly control said adjustment means.

12. The device of claim 10, further comprising an image recording device, for recording an actual body geometry, and an image processing means.

* * * * *